United States Patent [19]
Atkins

[11] 3,857,824
[45] Dec. 31, 1974

[54] PROCESS FOR THE PREPARATION OF BEAD POLYMERS USEFUL IN GEL PERMEATION CHROMATOGRAPHY

[75] Inventor: Bobby L. Atkins, Lake Jackson, Tex.

[73] Assignee: The Dow Chemical Company, Midland, Mich.

[22] Filed: July 5, 1972

[21] Appl. No.: 269,233

[52] U.S. Cl............................................. 260/80.3 N
[51] Int. Cl........................... C08f 1/11, C08f 15/02
[58] Field of Search................................ 260/80.3 N

[56] References Cited
UNITED STATES PATENTS

| | | | |
|---|---|---|---|
| 2,982,749 | 5/1961 | Friedrich et al. | 260/23 |
| 3,651,035 | 3/1972 | Atkins | 260/80 P |

FOREIGN PATENTS OR APPLICATIONS

| | | | |
|---|---|---|---|
| 1,242,661 | 8/1971 | Great Britain | 260/80.3 N |

*Primary Examiner*—Stanford M. Levin
*Attorney, Agent, or Firm*—A. Cooper Ancona

[57] ABSTRACT

The present invention relates to an improved process for preparing in bead form polymers useful in the gel permeation chromatography of water soluble polymers, e.g. polyethylenimines. The process involves suspending a water soluble monomer to be polymerized, e.g. acrylamide, together with the crosslinking agent e.g. N,N'-methylenebisacrylamide, and diluent in an inert hydrophobic organic liquid, e.g. saturated or unsaturated aliphatic hydrocarbons. Employed as the suspending agent system is the combination of a copolymer of an alkyl substituted alkenyl aromatic monomer, e.g. t-butyl styrene, and an N-vinyl heterocyclic monomer, e.g. N-vinylpyrrolidone, together with a cationic surfactant having the formula

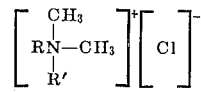

wherein R and R' are $C_8$ to $C_{18}$ hydrocarbyl radicals.

9 Claims, No Drawings

PROCESS FOR THE PREPARATION OF BEAD POLYMERS USEFUL IN GEL PERMEATION CHROMATOGRAPHY

Water soluble unsaturated monomers are conventionally polymerized by mass, solution or special water-in-oil suspension techniques. In U.S. Pat. No. 2,982,749 issued May 2, 1961 it is taught that aqueous solutions of such monomers and mixtures thereof can be suspended in an oil phase to form a suspension of globules ranging between 10 microns and 2 millimeters in diameter and polymerized therein to give polymeric products in bead form having a controlled size.

It has been disclosed in my recently issued patent, U.S. Pat. No. 3,651,035, that certain copolymers of alkyl substituted alkenyl aromatic compounds, e.g. alkyl styrenes, and N-vinyl heterocyclic compounds, e.g. N-vinyl cyclic amides, are useful as suspending agents in an inverse suspension polymerization process such as that disclosed in U.S. Pat. No. 2,982,749. Many water soluble unsaturated monomers can be polymerized by the inverse suspension disclosed therein. Such monomers include acrylamide, methacrylamide, acrylic acid and salts thereof, methacrylic acid and salts thereof, vinyl trimethyl ammonium chloride and others well known to the art. The monomers may be polymerized alone to form homopolymers or in combination with each other to form interpolymers.

The use of these copolymers as suspending agents as described in U.S. Pat. No. 3,651,035 is not entirely successful in that it is difficult to get beads sufficiently small and/or uniform in size for use in gel permeation chromatography (GPC). While some beads are formed, at least a portion of the beads must be ground prior to use in GPC processes.

The preparation of GPC resins for use in separating water soluble polymers is described in British Pat. No. 1,242,661. In this process a non-ionic surfactant was employed as the suspending agent for the monomer-diluent solution in the oil phase. The resulting polymer was processed by grinding and sieving, which indicates that the spherical particles made were unsatisfactory for GPC per se.

It has now been discovered that beads of sufficiently small size and of a rather uniform range of size can be prepared using the above described suspending agent in combination with a cationic surfactant. The useful cationic surfactants are those having the formula

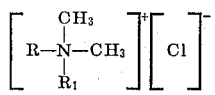

wherein R and R' are hydrocarbyl radicals having from 8 to 18 carbon atoms.

Aqueous solutions of the monomers to be polymerized can be varied widely in monomer concentration, from about 5 to about 80 weight percent of monomer in water depending upon the monomer and the polymerization temperature. The ratio of monomer phase or disperse phase to oil phase or continuous phase is also widely variable, advantageously from about 5 to 50 parts by weight of disperse phase to 95 to 50 parts by weight of continuous phase.

The continuous phase may be any inert hydrophobic liquid which can be separated readily from and which does not dissolve the polymeric product. Preferred among such materials are those aliphatic hydrocarbons that are liquids under the conditions of temperature and pressure employed in the polymerization. Representative of the preferred species are the aliphatic hydrocarbons containing from about 8 to 20 carbon atoms and mixtures thereof. Thus, a mixture of $C_{16}$ to $C_{20}$ alpha olefins is a suitable oil phase material as is an isoparaffinic solvent having a boiling point of about 400°C and sold as Stoddard Solvent M, and a $C_{12}$ to $C_{14}$ kerosene cut sold as Soltrol 130. Other useful aliphatic hydrocarbons will be known to those skilled in the art. The suspending agent of this invention will also function with aromatic hydrocarbons as the continuous phase.

The reaction parameters are not unconventional for an addition polymerization. The reaction time may be varied between broad limits depending upon the monomer moiety being polymerized, the activity and concentration of catalyst, the degree of conversion desired, and the temperature of polymerization. Typically the reaction will be substantially complete in from 10 minutes to 24 hours.

The temperatures may also be chosen between wide limits of from about 20°C to 100°C with the optimum temperature for any given system being determined by simple preliminary experiment.

The polymerization is usually carried out at atmospheric pressure. However, superatmospheric pressure is advantageously used when volatile ingredients are involved.

Polymerization initiators including peroxide catalysts such as t-butyl hydroperoxide or dimethane sulfonyl peroxide and redox systems such as t-butyl hydroperoxide or potassium persulfate in combination with usual reductants can be used in the practice of this invention. (U.S. Pat. No. 2,982,749, column 2, line 51 to column 3, line 2).

The present invention comprehends the polymerization of water-soluble unsaturated monomers in a monomer-in-oil dispersion by using certain of the indicated copolymers as a suspending agent to be used in an amount ranging advantageously from about 0.01 weight percent to about 10 weight percent, disperse phase basis, depending in part on the monomers being polymerized, the identity of the continuous phase, the size beads desired and upon other known factors. The optimum amount for any given system may be determined by simple preliminary experiment.

As disclosed in U.S. Pat. No. 3,651,035 the useful alkyl substituted styrenes are exemplified by n-propyl styrene, isopropyl styrene, n-butyl styrene, t-butyl styrene, t-octyl styrene and others having at least one side chain of three to about eight carbon atoms attached to the phenyl nucleus in any position relative to the vinyl group. When the side chain contains less than three carbon atoms the hydrophilic/lyophilic balance is sufficiently upset that the resulting polymers are characterized by a different community of properties from those of this invention.

The N-vinyl heterocyclic monomers which may be employed in the present method include the various N-vinyl cyclic amides and N-vinyl cyclic carbamates of the respective formulae:

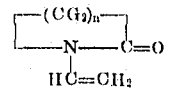

(vinyl lactams);

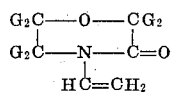

(N-vinyl-3-morpholinones); and

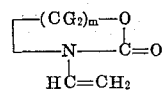

(N-vinyl-2-oxazolidinones and N-vinyl-2-oxazinidinones);
wherein each G is independently selected from the group consisting of hydrogen and alkyl radicals of from 1 to about 4 carbon atoms; $n$ is an integer from 3 to 5; and $m$ is an integer from 2 to 3.

Typical examples of useful N-vinyl heterocyclic monomers falling within the scope of the above formulae are: N-vinyl-2-pyrrolidone; N-vinyl caprolactam; N-vinyl piperidone; N-vinyl-5-methyl-2-pyrrolidone; N-vinyl-3,3-dimethyl-2-pyrrolidone; N-vinyl-3,3-dimethyl piperidone; N-vinyl-2-oxazolidinone; N-vinyl-5-methyl-2-oxazolidinone; N-vinyl-5-ethyl-2-oxazolidinone; N-vinyl-4,5-dimethyl oxazolidinone; N-vinyl-2-oxazinidinone; N-vinyl-6-methyl-2-oxazinioinone; N-vinyl-3-morpholinone; N-vinyl-5-methyl-3-morpholinone.

The copolymers of the alkyl styrenes and N-vinyl cyclic amides are easily prepared by known polymerization procedures including suspension and emulsion techniques employing conventional polymerization conditions. Aqueous suspension is a preferred technique.

Illustrative of surfactants useful in the process herein disclosed are the series of dialkyl dimethyl ammonium chlorides such as those commercially sold by Armour Chemical Co. under the tradename Arquad.

In accordance with the present invention, a process has now been discovered for making in bead form a heteroporous chromatographic resin. These resins are particularly suitable for use in the gel permeation chromatographic analysis of water soluble polymers. The resins comprise a crosslinked polymer in bead form which contains, in interpolymerized form, 0.5 to 2.5 mole proportions of an alkylidene bisacrylamide, the alkylidene group of which contains 1 or 2 carbon atoms, and 1 mole proportion of acrylamide, methacrylamide or a combination thereof. The more preferred resins contain 1 to 2 mole proportions of N,N'-methylene bisacrylamide for each mole proportion of acrylamide, methacrylamide or combination thereof.

The heteroporous polymers made according to the process of the invention are conveniently obtained by dissolving the monomeric amides in a solvent which is a non-solvent for the polymer, the solution is dispersed in droplet form with stirring in an immiscible liquid medium and the polymerization effected by radiation or a polymerization catalyst. The polymer is usually obtained in the form of substantially spherical particles, the size of which is dependent largely upon the stirring rate and the type and amount of suspending agent.

Good results have been obtained when the monomers are dissolved in dimethyl sulfoxide, dimethylformamide, a 1 to 4 carbon alkanol or a mixture thereof and using the suspending agents disclosed in U.S. Pat. No. 3,651,035 in conjunction with a cationic surfactant.

Other solvents for the acrylamide and alkylidenebisacrylamide are known to the art. Because each solvent has a different solvency for the monomer, each will give different ranges of porosity. Intermediate ranges can be obtained by using mixtures thereof or by the addition of water. The effects of diluents on pore size is known in the art. The better the diluent match for the polymer gel, the smaller the unit of gel structure and the smaller the size of voids therein.*

*Additional treatment of the subject of GPC resins can be found in Polymer Fractionation, ed. M.J.R. Cantow, Academic Press, New York (1967), pp. 123–179.

The polymerization reaction is carried out in a suspending or heat transfer medium to produce the crosslinked porous polymers in the form of beads. This is accomplished by dispersing the monomer-organo solvent solution in a second organic solvent, which is immiscible with the monomer solvent.

Advantageously, the solution of monomers is dispersed in an aliphatic $\alpha$-Olefin hydrocarbon having 16 to 20 carbon atoms, or aliphatic petroleum solvents of the Stoddard solvent type, e.g. Varsols. Lower molecular weight solvents such as heptane will not form stable suspensions, however.

GENERAL PROCEDURE

The continuous phase is formed by placing a quantity of the hydrocarbon, e.g. an $\alpha$-olefin, in a resin kettle equipped with a stainless steel stirrer, a nitrogen purge, a thermometer and a condenser. To this is added the cationic surfactant and the contents heated (45°–50°C) until the solution is clear. A solution of the monomer and crosslinking agent and the catalyst in the diluent solvent mixture is then added and the stirrer is started. The suspending agent is added and a nitrogen purge is maintained by slowly bubbling $N_2$ gas through the liquid in the flask. Temperature is held at 45°–50°C for a time sufficient to complete the reaction, usually about 8 hours. After cooling to room temperature, the polymer beads are separated and washed free of suspending agent with an alcohol, e.g. isopropyl. The beads are then washed with water and wet-sieved to separate them according to the appropriate desired ranges of size.

In general the temperature of polymerization reaction depends upon the particular initiator used. A temperature in the range of from about 5° to about 100°C is operable and a temperature of from 40° to 60°C is preferred.

The time of reaction depends upon choice of initiator and temperature, but can be from about one-half to about 72 hours. The preferred time is from 4 to 24 hours. Pressure from autogenous up to about 5 atmospheres can be applied, although autogenous is preferred.

For the polymerization reaction the initiator can be employed in a quantity of from about 0.01 to about 10% based on the total monomers and the preferred amount is from about 0.1 to about 5%.

The suspending agent is added in an amount of from about 0.5 to about 15 percent by weight based on the disperse phase (diluent + monomers + initiator) and preferably from about 3 to about 10 percent.

The cationic surfactant is employed in an amount of from about 0.05 to about 8 percent by weight based on the disperse phase, preferably from about 1 to about 5 percent.

EXAMPLE 1

A quantity (293 ml) of linear $C_{16}$-$C_{20}$ α-olefin was placed in a 1-liter Pyrex resin kettle equipped with a stainless steel paddle-type stirrer, a nitrogen purge, a thermometer and water-cooled condenser. To this was added 2.7 g. of the cationic surfactant (distearyl dimethyl ammonium chloride) and the contents of the flask was heated to 45°–50°C to form a clear solution. The cationic surfactant amounted to about 1.8% by weight based on the disperse phase. To this was then added a solution containing 25.0 g., 0.163 moles of recrystallized N,N-methylene-bisacrylamide (MBA), 11.6 g., 0.163 moles of recrystallized acrylamide (AAm) and 0.30 ml Lupersol 11* in 116 ml, 109.7 g. of dimethylformamide (DMF). The stirrer was then started and 30 ml. of a 20% solids** dispersion in water of a copolymer of 70% N-vinyl pyrrolidone-30% t-butylstyrene (NVP-TBS) was added to the kettle. The weight of copolymer was 6 grams or about 4% by weight of the disperse phase. A nitrogen purge was maintained by bubbling the gas slowly through the liquid contents of the flask while the temperature was held constant at 45°C for 18 hours. 6 to 8 hours is sufficient for the reaction.

* This is a 75% solution of t-butyl peroxypivalate in mineral spirits.
** This aqueous dispersion accounted for about 18% water in diluent.

At the end of the reaction the beads were separated from the suspending media by decanting the olefin and then the polymer beads were washed free of olefin with isopropyl alcohol which in turn was washed out with water and sized by wet-sieving. About 85% of the beads were passed by 105μ sieve and retained on a 44μ sieve. Of the 15% outside this range, about one-third to one-half was above, the rest below. Approximately three-fourths of the 85% was shown to be in the range of 40–50μ diameter beads by using a split-image microscope.

When tested in a chromatographic column using dextrans of known molecular weight the 40–50μ diameter beads showed an exclusion limit of 30,000 molecular weight, i.e. all molecular sizes above about 30,000 were excluded from the beads and came out of the column in the interstitial volume.

EXAMPLES 2–4

In like manner other beads were made using different conditions, e.g. amount of suspending agent, type stirrer, percent water, which are shown in tabular form below together with the permeability test results. All percentages are by weight.

Water appears to have some adverse affect in reducing the permeability. Note that in Example 1, in which there was 18 percent water present in the diluent, the permeability limit was 30,000, whereas in Examples 2, 3 and 4 the permeability is greater when less water is present. This phenomenon is well known by those who have tried varying the porosity of the resins used in GPC by changing diluents or mixing them.

The following example is presented for comparison purposes to show the result of preparing the heteroporous copolymer from acrylamide and N,N'-methylene bisacrylamide without the use of the cationic surfactant.

EXAMPLE 5— COMPARATIVE

Varsol I (a petroleum solvent, B.P. 160°–200°C) was used as the suspending media and 500 ml was placed in a 1-liter resin kettle, purged with nitrogen and heated to 45°–50°C. The MBA (41.0 g.) and AAm (19.0 g), which were present in equimolar quantities, were dissolved with heating (45°C) and stirring in 150 g. DMF and 0.16 g. Vazo (α,α'-azobisisobutyronitrile) catalyst dissolved in <1 ml. DMF was added to this solution. The DMF solution of monomers and catalyst was then added to the Varsol and the stirrer started and about 4.0 g. of the suspending agent of Example 1 was added in a 20% aqueous solution. Thus, the suspending agent was present in an amount which was about 2% of the disperse phase.

The Vazo catalyst requires a higher temperature of activation than the Lupersol so the temperature of the reactor was raised to and maintained at 70°C.

After 1 hour the suspension began to thicken and the particles balled together. After reacting overnight the reactor vessel was cooled to about room temperature and the particles washed with isopropyl alcohol. Examination showed a wide divergence in the size of the particles, the larger of which were irregular in shape and not very spherical in form. Wet sieving and light grinding to separate agglomerated particles revealed no spherical beads, but only irregularly shaped particles.

Thus, by comparing the above experiment with those previously run, it is apparent that the use of the cationic surfactant in conjunction with the suspending agent provides an improved method for making the beads useful for GPC purposes.

I claim:

1. In the process of making heteroporous polymers in bead form useful in gel permeation chromatography wherein a vinyl monomer of acrylamide or methacrylamide is copolymerized with an n alkylidene bisacrylamide as a crosslinking monomer, both monomers being dissolved in a diluent solvent and suspended in an inert hydrocarbon liquid immiscible with said mono-

| Ex. No. | Suspending Agent (%) | Temp. (°C) | Amount H$_2$O (%)* | Type Stirrer | Particle Size (μ) | Permeability (m.w. limit) |
|---|---|---|---|---|---|---|
| 2 | 2 | 50 | 9.9 | Paddle | 45–200 | 200,000 |
| 3 | 4 | 45 | 4.8 | Propeller | 30–200 | 200,000 |
| 4 | 2 | 45 | 3.9 | Paddle | 150–300 | 80,000 |

*The percent water is based on weight of diluent, i.e. DMF.

mer solution, the improvement which comprises employing as components in said suspension a copolymer of an alkyl substituted styrene wherein said alkyl group contains from 3-8 carbon atoms and an N-vinyl heterocyclic monomer in combination with a cationic surfactant, having the formula

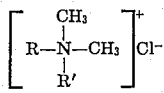

wherein R and R' are hydrocarbyl radicals having from 8 to 18 carbon atoms as the suspending system, wherein said substituted styrene-N-vinyl heterocyclic copolymer is employed in an amount of 0.5 to 15 percent and said surfactant is employed in an amount of 0.05 to 8 percent both based on the weight of the disperse phase and wherein said crosslinking monomer is employed at 0.5 to 2.5 moles per mole of vinyl monomer.

2. The process of claim 1 wherein the copolymer in said suspending system is a copolymer of t-butyl styrene and N-vinyl-2-pyrrolidone.

3. The process of claim 2 wherein the cationic surfactant is distearyl dimethyl ammonium chloride.

4. A process of making heteroporous polymers in bead form which comprises the steps of
   1. dissolving a cationic surfactant in a hydrocarbon liquid in a reaction vessel,
   2. providing a solution of monomers consisting of acrylamide or methacrylamide and an alkylidene-bisacrylamide and a polymerization catalyst in a diluent solvent selected from the group consisting of dimethylformamide, dimethyl sulfoxide, and an alkanol containing 1-4 carbon atoms,
   3. suspending said solution of monomers and catalyst in said hydrocarbon liquid containing said surfactant,
   4. adding a suspending agent which is a copolymer of an alkyl styrene, wherein said alkyl group contains 3-8 carbon atoms and an N-vinyl cyclic amide,
   5. polymerizing said monomers and,
   6. separating the so-prepared beads from the reaction system, wherein said surfactant is employed in an amount of 0.05 to 8 percent and said suspending agent is employed in an amount of 0.5 to 15 percent, both based on the weight of the disperse phase and wherein said bisacrylamide is employed at 0.5 to 2.5 moles per mole of acrylamide or methacrylamide.

5. The process of claim 4 wherein the hydrocarbon is a mixture of $C_{16}$-$C_{20}$ alpha olefins.

6. The process of claim 5 wherein the vinyl monomer is acrylamide and the divinyl monomer is N,N'-methylenebisacrylamide.

7. The process of claim 6 wherein the catalyst is an organic peroxide.

8. The process of claim 7 wherein the organic peroxide is t-butyl peroxypivalate.

9. The process of claim 1 wherein the copolymer suspending agent is a copolymer of t-butyl styrene and N-vinyl-2-pyrrolidone and the cationic surfactant is distearyl dimethyl ammonium chloride.

* * * * *